J. VANCE.
Fence.

No. 229,211. Patented June 22, 1880.

WITNESSES:
C. Neveux
C. Sedgwick

INVENTOR:
J. Vance
BY Munn & Co
ATTORNEYS.

UNITED STATES PATENT OFFICE.

JOHN VANCE, OF FOREST, ONTARIO, CANADA.

FENCE.

SPECIFICATION forming part of Letters Patent No. 229,211, dated June 22, 1880.

Application filed June 17, 1879.

*To all whom it may concern:*

Be it known that I, JOHN VANCE, of Forest, in the county of Lambton, Province of Ontario, and Dominion of Canada, have invented a new and Improved Fence, of which the following is a specification.

The object of my invention is to provide a fence that will effectually prevent cattle, fowls, dogs, &c., from passing into the field it surrounds, and which will also be strong and durable.

Figure 1:
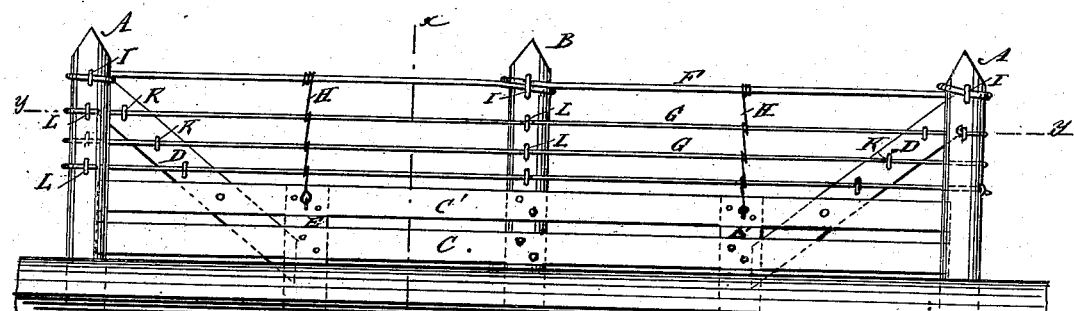
Figure 2:
Figure 3:
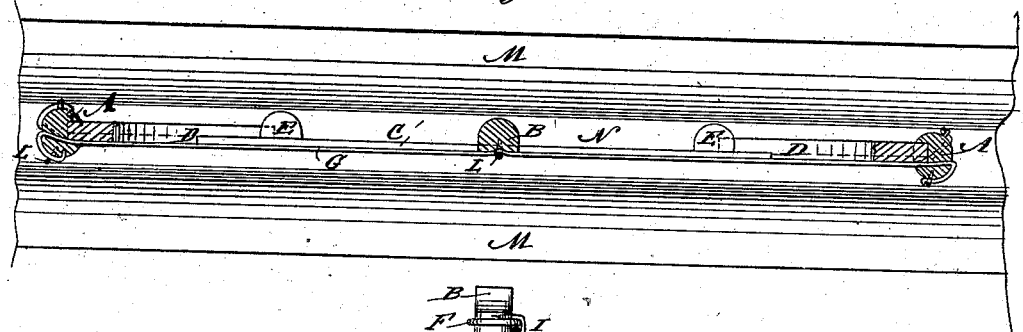
Figure 4:
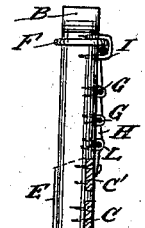

Figure 1 represents a front elevation. Fig. 2 represents a plan view. Fig. 3 represents a horizontal longitudinal section on the line $y\ y$. Fig. 4 represents a vertical cross-section on the line $x\ x$.

A A are the end posts, and B represents one of the intermediate posts. C C' are the skirting-boards; F, the top wire, and G G the intermediate wires. D D are braces, and E E small posts. M M are the gutters at each side of the fence, and N is the mound between them.

The fence is built in the following manner: The posts A B are secured in the ground in the ordinary manner, about twelve feet (more or less) apart. About twelve inches from the level of the ground a board, C, about six inches wide, is nailed to the posts, and about three inches above this another like board, C', is also nailed to the posts. A short post, E, is driven into the ground near the end posts, and then cut off flush with the upper edge of the board C', and the boards C and C' are then nailed to this short post. The brace D is then fastened to the posts A and E. The object of this brace is to stiffen and strengthen the post A, so that it is not drawn over when the wires are drawn taut, and to give the whole fence more rigidity. Two or three furrows are turned up at the bottom of the fence by a plow, so that a gutter, M, is formed at each side of the fence and parallel to the same, and a mound, N, is formed under the fence, which mound reaches to the lower edge of the board C. About twenty-seven inches of solid fence are thus provided.

The end posts of each section must be set in such a manner that half of their width projects beyond the line of the fence, so that the wires will pass through the centers of the end posts, but yet rest on the outer surface of the intermediate posts.

The wires G, which may either be plain or barbed, are fastened and secured in this way: They are passed through the end post, A, then bent half-way around the same, and then drawn taut and secured in the same manner to the other end post. The part that is laid around the post is alternately laid to the right and to the left. When the wire is drawn taut, beginning at the starting-point, a short kink is sprung into the wire at every post and brace, and then a staple, L, about two and one-half inches in length, is driven down tight over this kink, as is shown in Fig. 3. All the wires are fastened in the same manner, except the one that forms the top of the fence. This top wire is two gages larger than the rest. It is drawn through the end post, and then passed entirely around the same, and is passed around the tops of the intermediate posts and secured by staples, as is shown in Figs. 1, 2, and 4. The standing wires H H are secured as shown, and are drawn once or twice around each wire. The wires are to be so arranged that the spaces between them increase toward the top.

The advantages of my fence are its simplicity and strength, and the combination of a closed bottom part and an open upper part.

The kinks on the wire will allow a contraction and expansion of the wires without a breaking of the same, and also give the same a firm hold by means of the staple, so that when a wire breaks it will only slacken in one panel. As the top wire passes around each post, and is thus firmly secured, it will prevent stock from breaking or pushing it off.

The boards at the bottom of the fence will effectually prevent all poultry and small stock from passing through.

There are, of course, as many intermediate posts, B, as the length of the line of fence requires; but the corner posts, A, are alone braced to sustain the strain of the continuous wires. Where any two lines corner, running from thence at an angle to each other, a separate post may be employed at the corner for each line.

Having thus described my invention, I claim as new and desire to secure by Letters Patent—

A fence consisting of wire rails and the corner-posts A, secured by a brace, D, to short posts E, driven into the ground and nailed to skirting-boards, as shown and described.

JOHN VANCE.

Witnesses:
ANDREW G. ANDERSON,
ALLAN McPHERSON.